(12) United States Patent
Halamka

(10) Patent No.: US 8,650,814 B2
(45) Date of Patent: Feb. 18, 2014

(54) ENERGY EFFICIENT GARAGE

(75) Inventor: Todd D. Halamka, Chicago, IL (US)

(73) Assignee: Greenway Self Park, LLC, Chicago, IL (US)

( * ) Notice: Subject to any disclaimer, the term of this patent is extended or adjusted under 35 U.S.C. 154(b) by 546 days.

(21) Appl. No.: 12/655,056

(22) Filed: Dec. 21, 2009

(65) Prior Publication Data

US 2011/0011015 A1  Jan. 20, 2011

Related U.S. Application Data

(63) Continuation-in-part of application No. 12/460,380, filed on Jul. 17, 2009, now abandoned.

(51) Int. Cl.
*E01F 9/00* (2006.01)

(52) U.S. Cl.
USPC .................................. 52/175; 52/235; 52/33

(58) Field of Classification Search
USPC .................. 52/175, 33, 174, 176, 235, 236.6, 52/302.1, 236.3, 173.1
See application file for complete search history.

(56) References Cited

U.S. PATENT DOCUMENTS

| | | | | | |
|---|---|---|---|---|---|
| 1,725,991 A | * | 8/1929 | McBride | | 52/175 |
| 3,290,837 A | * | 12/1966 | Weston | | 52/30 |
| 3,824,752 A | * | 7/1974 | Weston | | 52/176 |
| 5,234,305 A | * | 8/1993 | Hotta et al. | | 414/228 |
| 5,720,135 A | * | 2/1998 | Paquette | | 52/174 |
| 6,749,393 B2 | * | 6/2004 | Sosonkina | | 415/4.1 |
| 7,172,386 B2 | * | 2/2007 | Truong et al. | | 415/4.1 |
| 2011/0011014 A1 | * | 1/2011 | Halamka | | 52/173.1 |

OTHER PUBLICATIONS

Architectural Record. "Santa Monica Civic Center Parking Structure", May 2008. <http://archrecord.construction.com/projects/bts/archives/transportation/08_CivicCenterParking/default.asp>.*

* cited by examiner

*Primary Examiner* — Branon Painter
(74) *Attorney, Agent, or Firm* — Ronald A. Sandler

(57) ABSTRACT

A multi-storied garage having an energy efficient ventilation system that incorporates a unique window array and vertically mounted energy producing wind turbines located in a corner of the garage structure that would otherwise be unusable for vehicle parking.

1 Claim, 17 Drawing Sheets

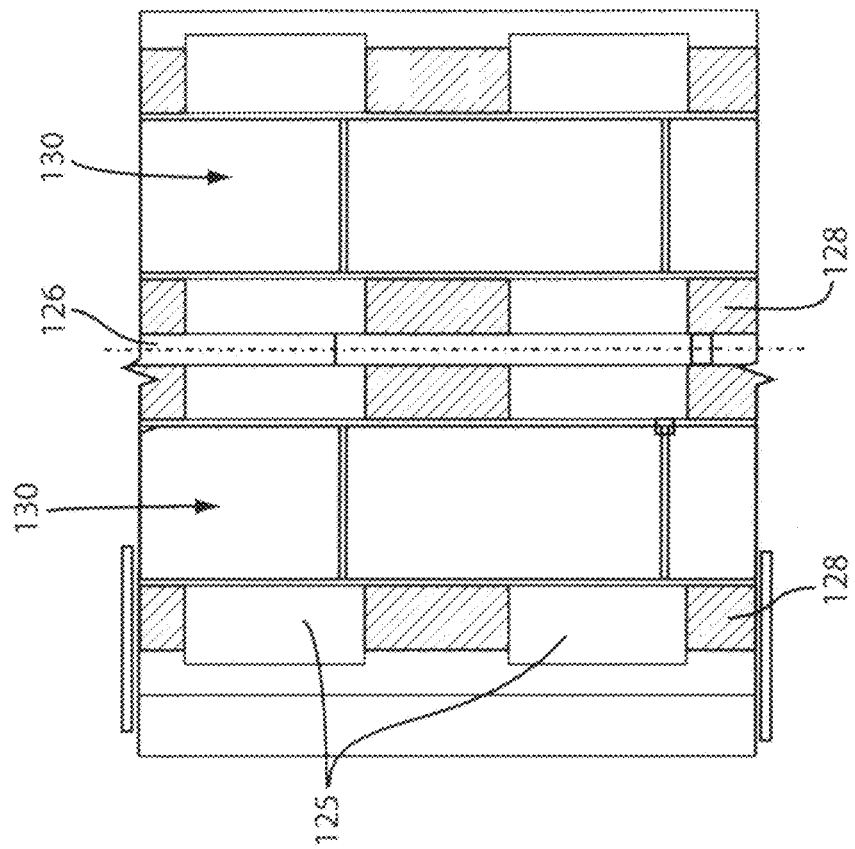
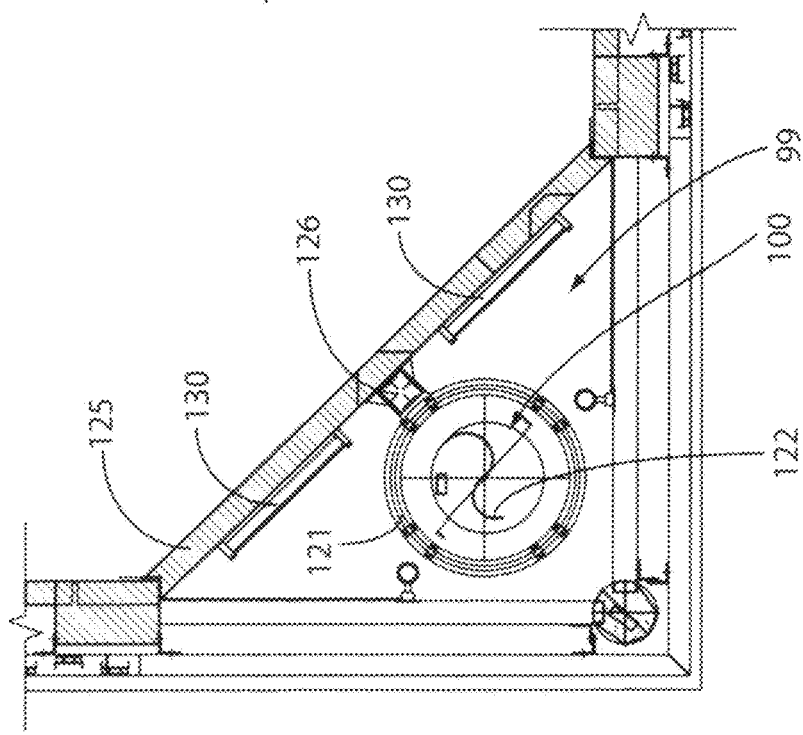
Fig. 19
Fig. 18

ENERGY EFFICIENT GARAGE

This application is a continuation in part of U.S. application Ser. No. 12/460,380, filed Jul. 17, 2009 now abandoned, entitled Energy Efficient Garage.

BACKGROUND OF THE INVENTION

1. Field of the Invention

The present invention relates to the field of multi-story parking garage structures and, more particularly, to an energy efficient garage structure.

2. Discussion of the Background

Multi-story self park garages generally are constructed in urban areas, often near or adjacent to office towers, residential buildings or other commercial structures or stadiums. More recently these structures are provided with facades that are more esthetically appealing to better fit the surrounding environment and to complement adjacent structures. Also, for convenience of nearby residents and office workers, in recent years the first or ground floor of these structures has been used for retail space, such as for example drug stores. For those garages that are completely enclosed, an expensive heavily mechanized ventilation system is required to eliminate the vehicle exhaust gases that otherwise might accumulate. Most major cities have specific building codes that control the ventilation requirements. For those garages that use an open air approach (thus vastly eliminating the bulk of the mechanical ventilations system), there generally also is a requirement that at least 20% of the façade be open to permit adequate ambient ventilation allowing noxious fumes to escape. This has resulted in a variety of facades, none of which are esthetically pleasing and generally do not complement the nearby environment.

Multi-story garages also generally require at least two elevators; extensive lighting on each floor and use a multitude of other energy drawing equipment during their daily operation. Most such garages have a typical floor plan (for vehicle traffic) that tends to be of a spiral nature with up/down ramps. This leaves an unused area of the floor plan in at least one corner on each floor. To economically use this space, the elevators frequently are located in the corners. However it would be economically wasteful to build elevators in all four corners, as not that many are required.

It is a primary purpose of the present invention to provide both an air efficient ventilation system that has a unique and esthetically pleasing façade, and an energy producing system employed to take advantage of wind turbines for generating some of the power requirements of the facility. Preferably these turbines will be stacked and disposed at a corner of the garage to therefore make more efficient use of the dead space created by traditional vehicle flow patterns.

3. Description of the Prior Art

The present garage structure makes use of various commercial components, but to applicant's knowledge they have not been combined in the manner claimed herein. The façade structure in part consists of a unique arrangement of arrays of energy efficient translucent linear channel glass, of a type known as Pilkington Profilit glass channels. The preferred wind turbines of the present invention are known as Aerotecture International wind turbines. That company makes several different arrays, including an independent structure of stacked arrays.

SUMMARY OF THE INVENTION

In view of the foregoing esthetic and energy deficient disadvantages inherent in known multi-story parking garages, the present invention provides an energy efficient garage which uses both natural ventilation in an esthetically pleasing arrangement, combined with wind turbines uniquely located for energy generation and placed for efficient use of structural space in the garage facility.

To attain these advantages, the present invention, in its preferred embodiment, generally comprises a multistory garage structure having a series of vertically stacked wind turbines for energy generation preferably disposed and integrated into the building structure in a manner that allows air flow against the turbines in an least two directions.

In a preferred embodiment, the wind turbines are located at what would be an interior corner of the garage facility thereby to efficiently take advantage of what would be unused space in the garage floor plan, while efficiently permitting multi-directional exposure of the turbines thru an open corner vertical facade without requiring an outbuilding area of the structure.

Yet another object is provide a glass façade for the structure which permits natural ventilation of the facility with an esthetic façade arrangement that has vertical openings arranged in a plurality of arrays, thereby seemingly providing a particular pattern of glass which enhances the building structure while effectively minimizing the visual effects of the openings.

A preferred objective is to provide a pattern of glass channels in which some overlap while others are spaced and which are arranged in a progression across a façade providing the structure with a dynamic quality for viewers while the spacing between the glass is calibrated to balance the garage natural air flow distribution and day-light distribution.

The vertical spacing of the glass channels and the use of the stacked wind turbines also cooperate to enhance air flow through the garage structure, integrating the benefits of both structures.

These and other objects of the invention, along with the various features of novelty which characterize the invention, are pointed out with particularity in the appended claims forming a part of the disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 18 is an exemplar plan view of one floor showing the position of the wind turbine structure in the corner of the garage facility;

FIG. 19 is an elevational view of the corner of the garage wall and structure of FIG. 18, without the wind turbine in place;

DESCRIPTION OF THE PREFERRED EMBODIMENT

Figure 1:
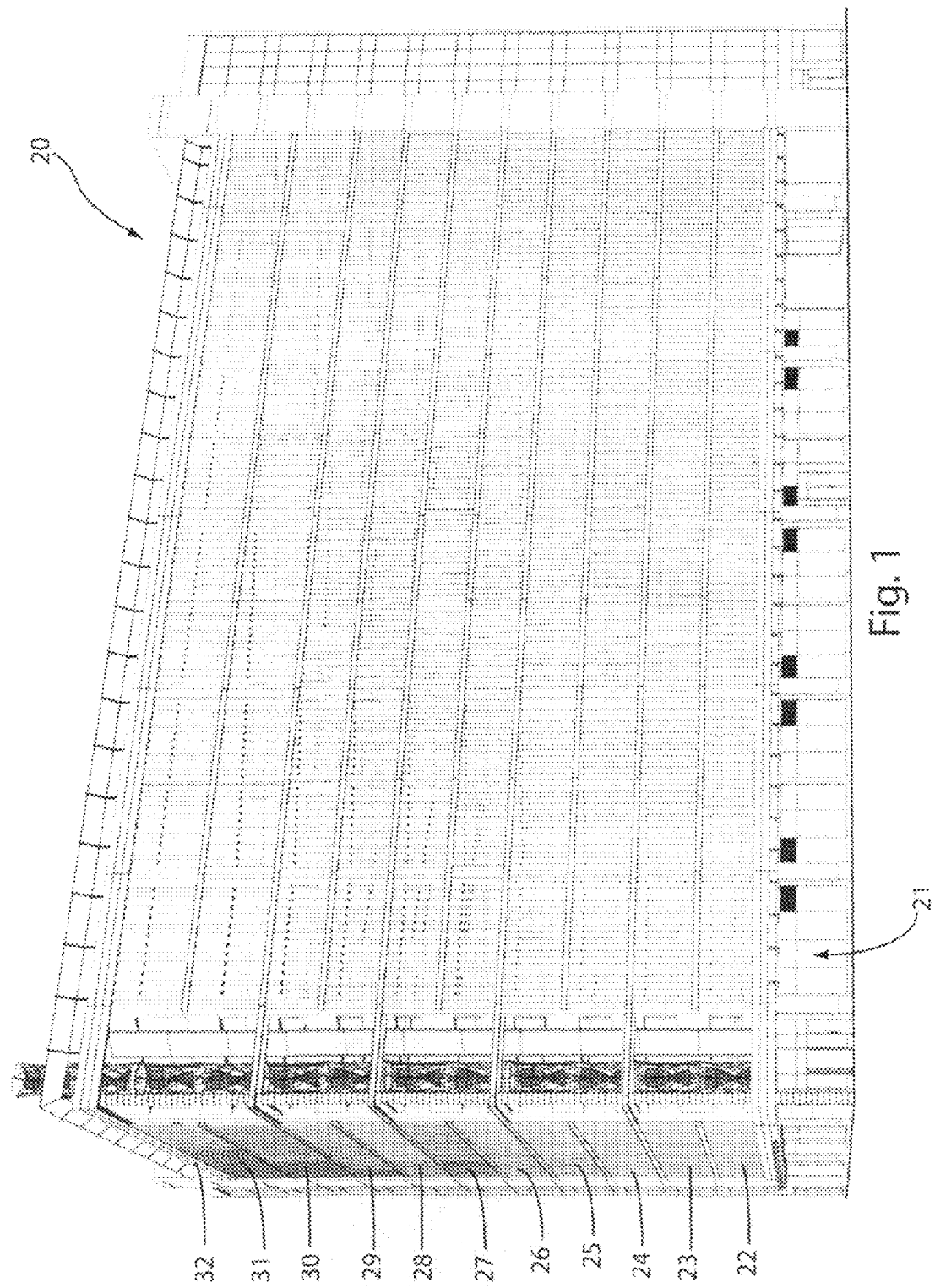
FIG. 1 is a perspective view of a new energy efficient garage structure according to the present invention.

One example of a preferred form of garage structure incorporating the various inventions is depicted as 20 in FIG. 1 in perspective form. In this embodiment, the garage 20 is shown as a free standing structure to be located at the corner of a city block. While only two side walls are illustrated, the opposite sides may be mirror images (if for example the garage is located near a sports facility) or the opposing walls may be designed with less elegant facades if the garage will abut adjacent buildings where the facades will be partially or fully hidden from view.

In this instance, the garage 20 may consist of a ground or base line level 21 of retail space and employ internal ramps of various kinds (not shown, but different routing being well known to those in the art) permitting, in this case, effective spiral movement of vehicles from bottom to top and reverse for exiting. This particular version has roughly ten floors available for parking above the retail level, generally designated as 22-31 in FIG. 1.

The garage 20 has roof line 32 that may or may not be decorated and may or may not provide for additional parking at the roof top level. In the preferred embodiment the garage roof is provided with plantings to provide an esthetic and air friendly environment. The planted roof will provide both visual and recreational amenity as well as localized climatic cooling of roof and garage summer heat gain.

Figure 2:
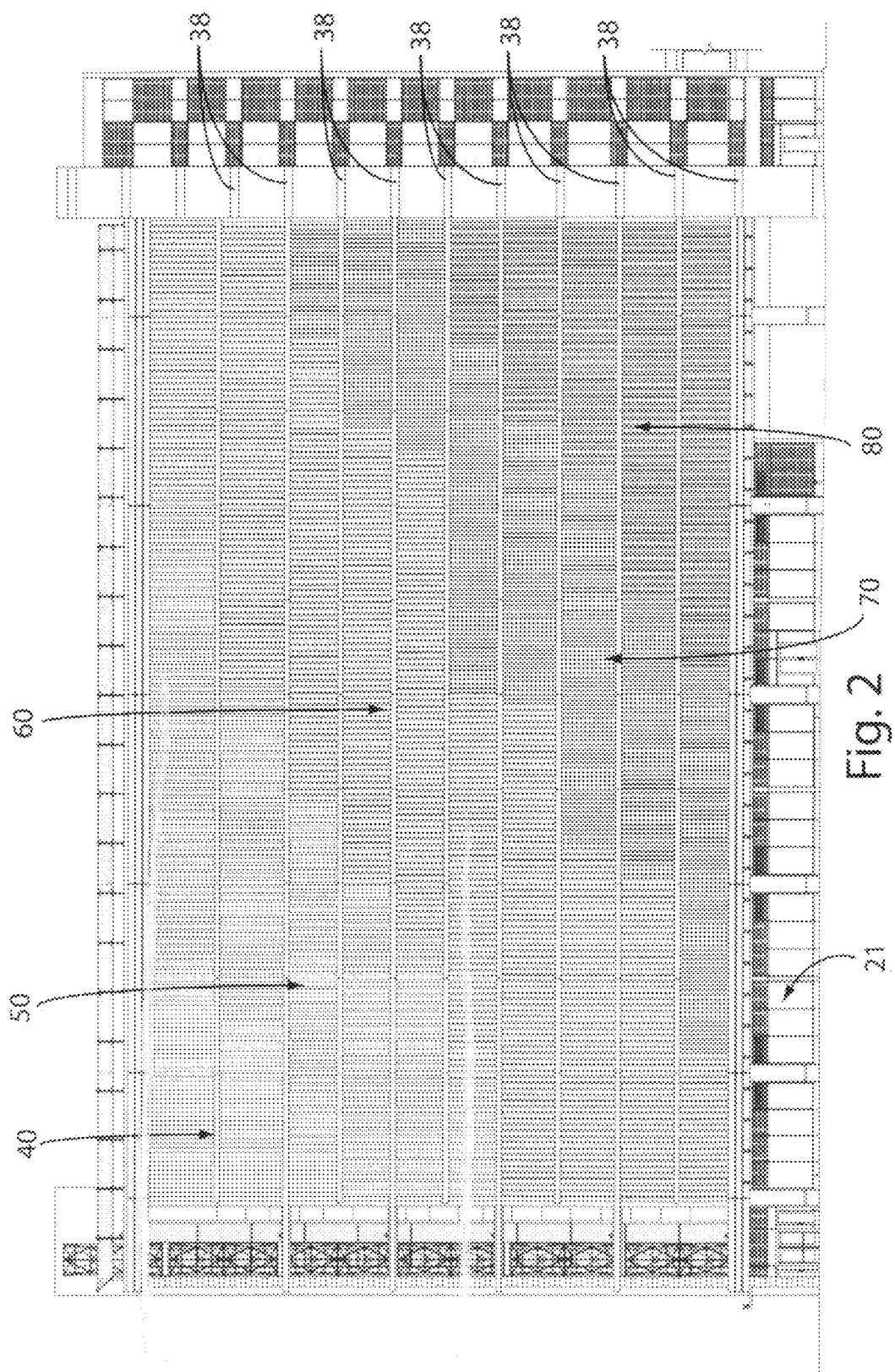
FIG. 2 is an enlarged elevation view of one exterior wall of the novel garage structure.
Figure 3:
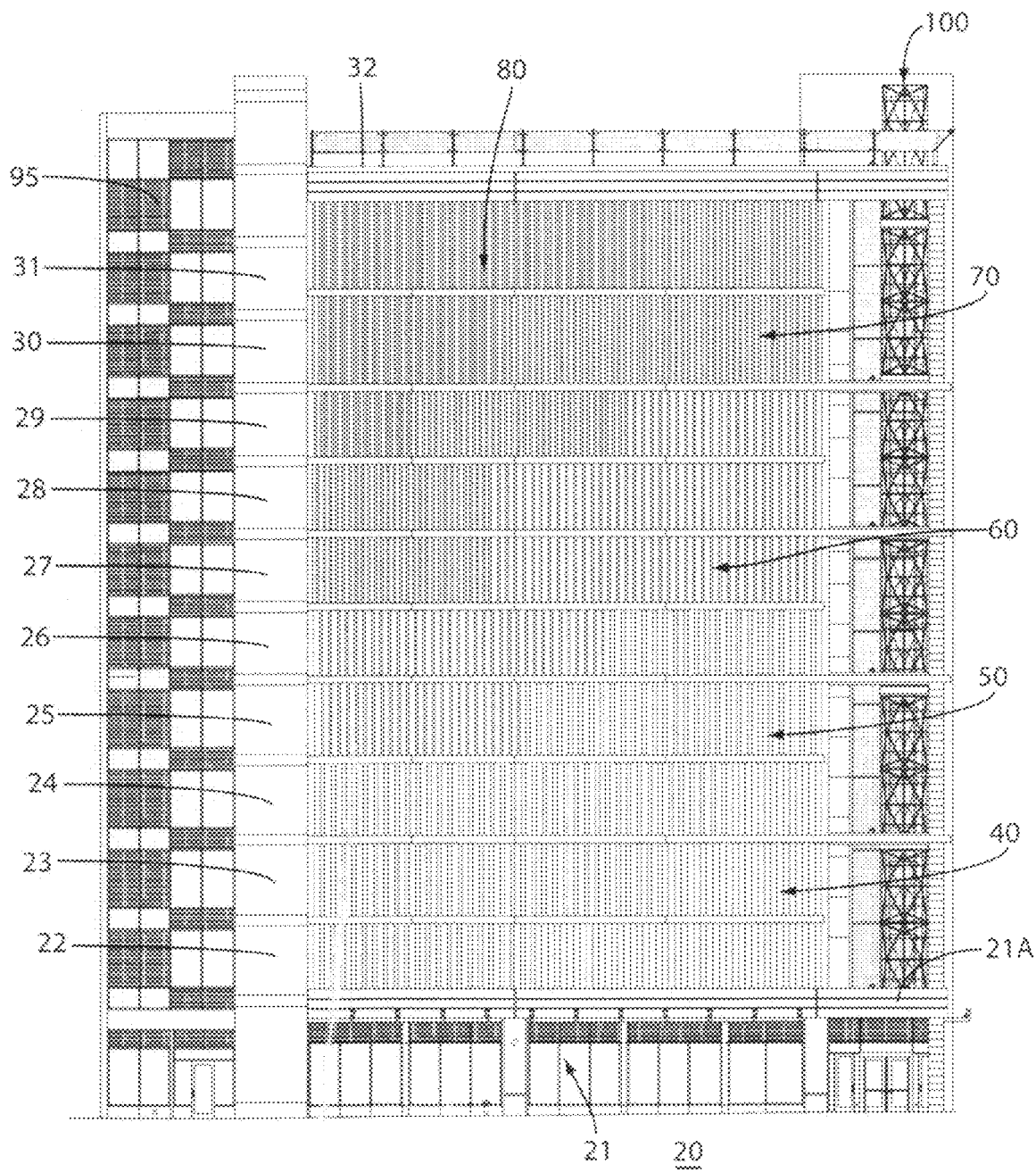
FIG. 3 is an enlarged elevation view of an adjacent wall of the garage structure, and also depicting the wind turbine structure in a corner thereof.

Each of the two sides walls or facades depicted in FIGS. 2 and 3 has a particular arrangement of vertical glass channels spaced in a variety of arrays for both esthetic purposes and to facilitate the required air flow to evacuate noxious exhaust fumes from the vehicles within the garage. These will be explained in greater detail hereinafter.

Figure 4:
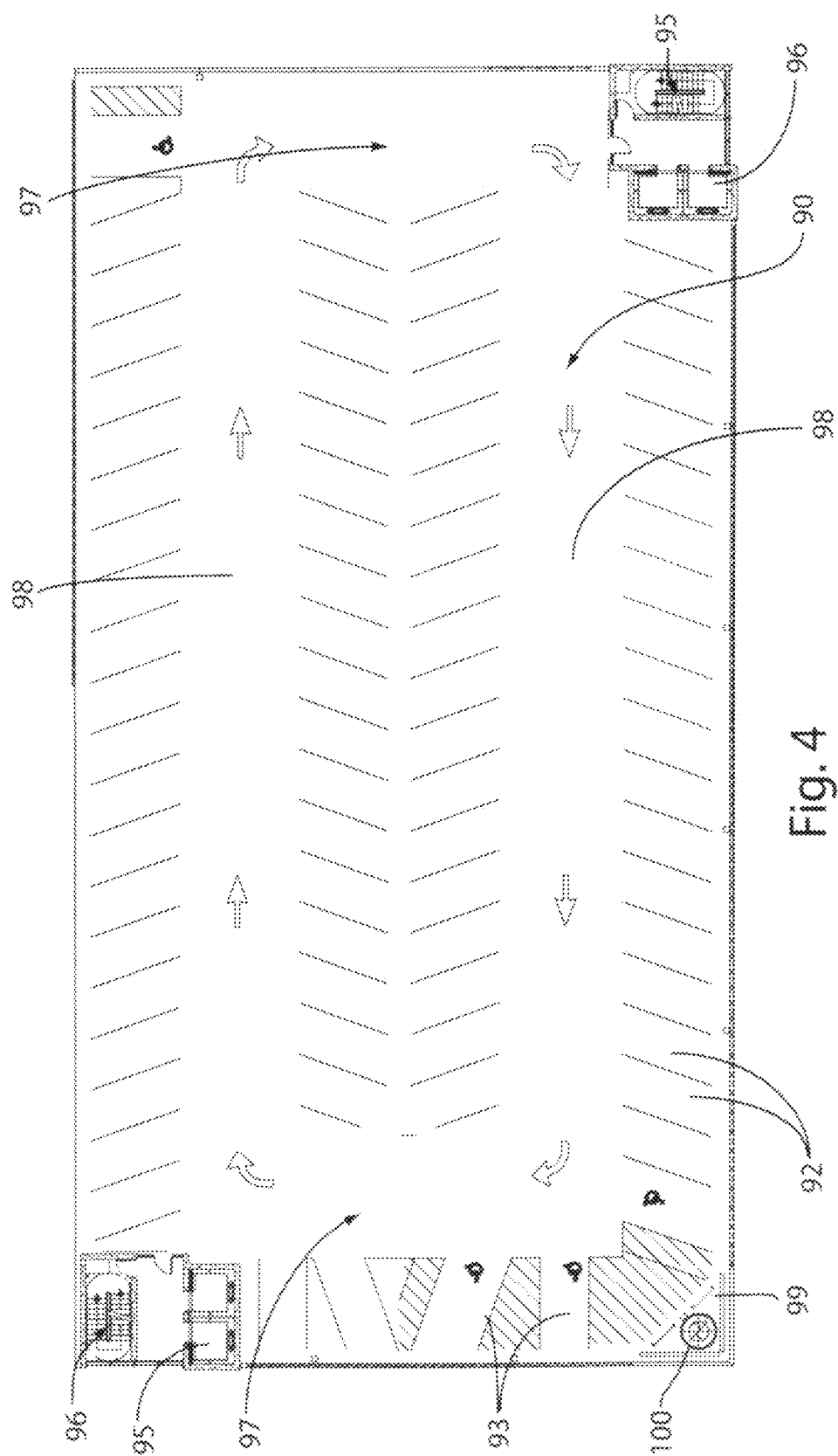
FIG. 4 is a typical floor plan view as would exist in the garage of FIG. 1.
Figure 5A:
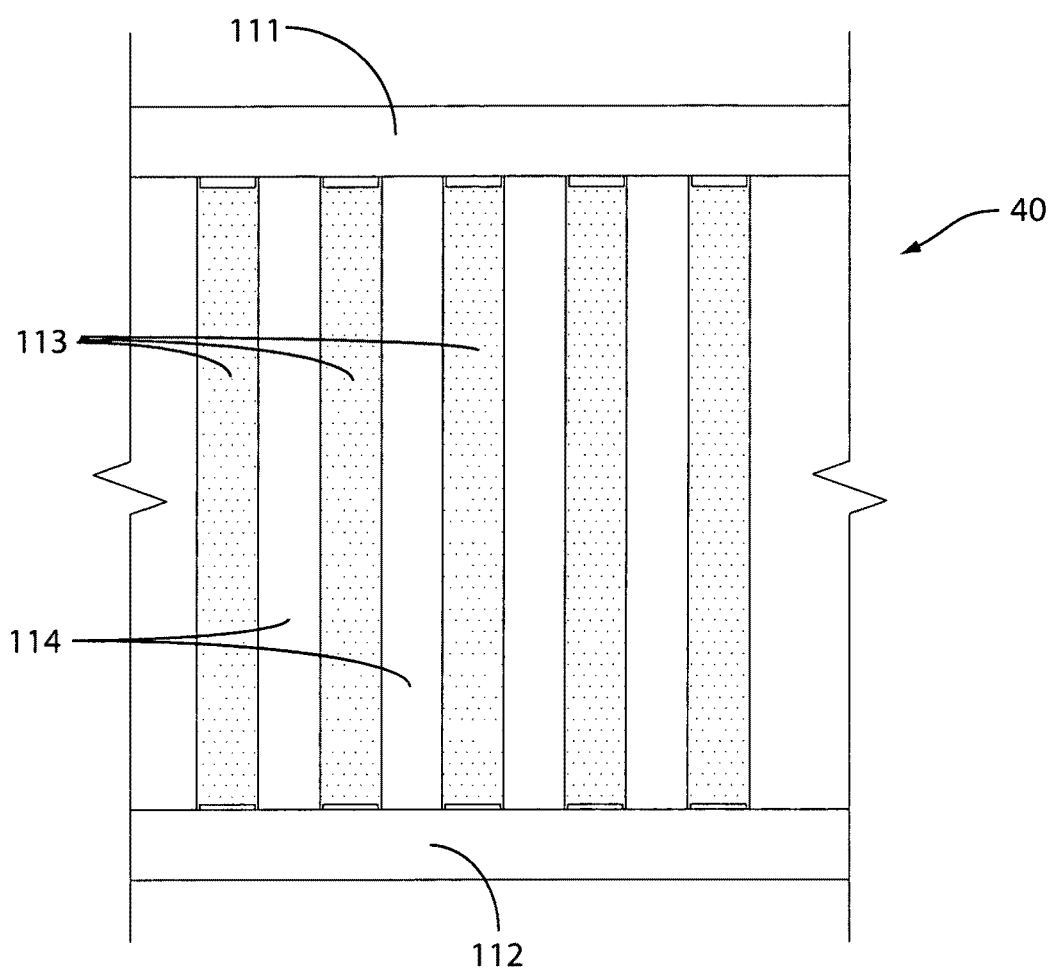
FIGS. 5A and 5B schematically depict elevation and plan views of a first pattern of the glass channel arrays used in the garage façade.
Figure 5B:
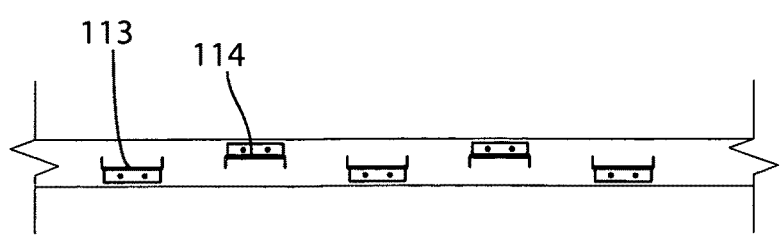

FIG. 4 depicts a typical floor plan for this particular garage. It will be understood that the parking slots in this version consists of ramps 98 going up or down and with horizontal sections 97 at the ends of each ramp and in the corners. In this particular embodiment, two sets of elevators 96 (and stairwells 95) are depicted in opposite corners.

As is apparent from the lines 92 and 93 which delineate parking lanes for vehicles, certain corners become "dead" space where no vehicle can be parked because of the interference with an adjacent vehicle. Thus at the lower left hand corner of FIG. 4, designated as 99 on the drawing, it is clear that the angled lines 92 on the ramp 98 and the horizontal lines 93 on the end section 97 that no vehicle could be parked in the corner.

To make efficient use of that "dead" or otherwise unusable space, the wind turbine schematically illustrated as 100 in FIG. 4 is disposed in that corner 99.

Before describing the façade and wind turbines in detail, it should also be understood that sometimes parking structures are not located at corners of a block but are disposed between adjacent buildings, and therefore would have no "free" corner. While the wind turbines still could be used at a corner and integrated into the building structure, this may inhibit sufficient air flow to adequately power the turbines to make them cost effective. In such case, a supported overhead parallel to the top 21A of the retail space may be provided, and the wind turbines mounted exteriorly of the building to allow for air flow.

Turning now to FIG. 2, it will be seen that the façade appears to have at least five different arrangements of arrays of glass channels designated as Patterns 1 through 5 and generally referred to as sections 40, 50, 60, 70, and 80. In the preferred embodiment, the glass channels may be of the type known as a Pilkington Profilit translucent linear channel glass which are supported by extruded metal tubes. This provides a façade wall that partially obscures vision but allows light to be both partially reflected and to pass thru to provide interior lighting during daylight hours. The glass may be selected for various tint and degree of translucency. It will be apparent from the drawings that each of the channels have a major face parallel to the structural walls of the garage walls behind the channels.

In the preferred embodiment, slightly green-tinted glass formed into a 10" wide C-shaped vertical channel or plank, and arranged in various arrays, are supported at the top and bottom by an aluminum tube. As can be seen in FIG. 2, the garage typically has concrete horizontally disposed beams at the perimeter which, when coupled with appropriate internal columns, permits adequate support of the internal ramps and landings. In the depicted embodiment, the angled ramps 98 are at the perimeter; in some structures the inclined ramps are centrally located while the horizontal landings extend around the entire inner perimeter.

As will be seen in FIG. 2, the concrete floors 38 at the exterior perimeter are clad in well known fashion with some type of complementary metal casing which also provides the structure for holding the glass channels, as described hereinafter.

Five arrays or patterns are provided on each side will, and are created with the glass channels by varying the spacing and orientation of the channels. The densest pattern overlaps the channels by ⅔ of their width, while the most open spacing has a 10" gap between channels. These arrays are best depicted in FIGS. 5-9. The variable glass channel spacing is carefully calibrated against opposite walls to balance the garage's natural air flow distribution and meet local building requirements which may, for example, require 20% open wall space.

As illustrated in both FIGS. 2 and 3, each of the side walls uses five different patterns of channels which are arranged in a progression across the facades, transitioning from the densest spacing to the more open. This subtle effect will lend the structure a dynamic quality as people walk and drive by, while the glass itself and spacing shields views into the garage. During the day, the channel glass will catch and reflect sunlight. At night exterior, projecting up-lights above the ground floor retail spaces will wash the façade with light, providing an enhanced appearance, much like an office building. It will be understood that by appropriate calibration other arrays and spacing may be provided both for esthetic reasons or to satisfy air flow requirements.

As seen in FIGS. 5-9 there are schematically illustrated the five different array patterns of the type distributed across the building facades. Pattern 1 (40) is depicted in FIGS. 5A and 5B. Upper and lower aluminum tubes 111 and 112 hold the glass channels 113 in position. In this array, referenced as a 3/3 spacing, each of the channels 113 are spaced 10" apart, edge to edge providing an open gap as at 114. As each channel is 10" wide, the pattern is thus 3/3 and repeats for 6041 (3-10" channels and 3 ten inch spaces).

Figure 6A:
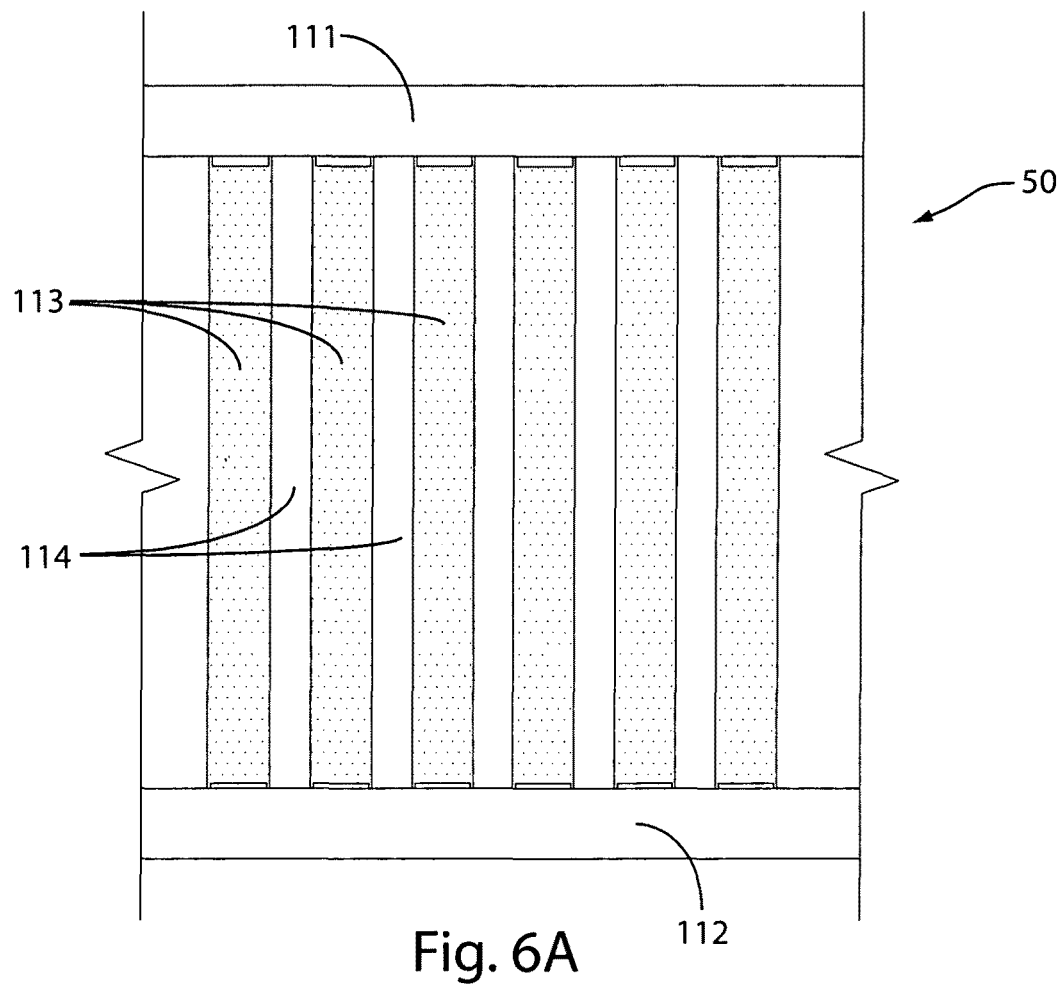
FIGS. 6A and 6B depict a second pattern of the glass channel arrays of the façade.
Figure 6B:
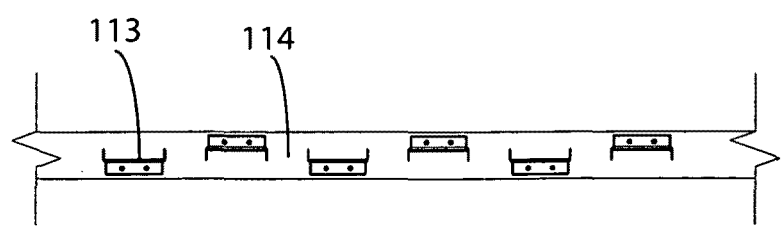

Pattern 2 (50) is depicted in FIGS. 6A and 6B. This is referenced as ⅔ spacing. The gap distance 114 between each ten inch channel 113 is 6.75".

Figure 7A:
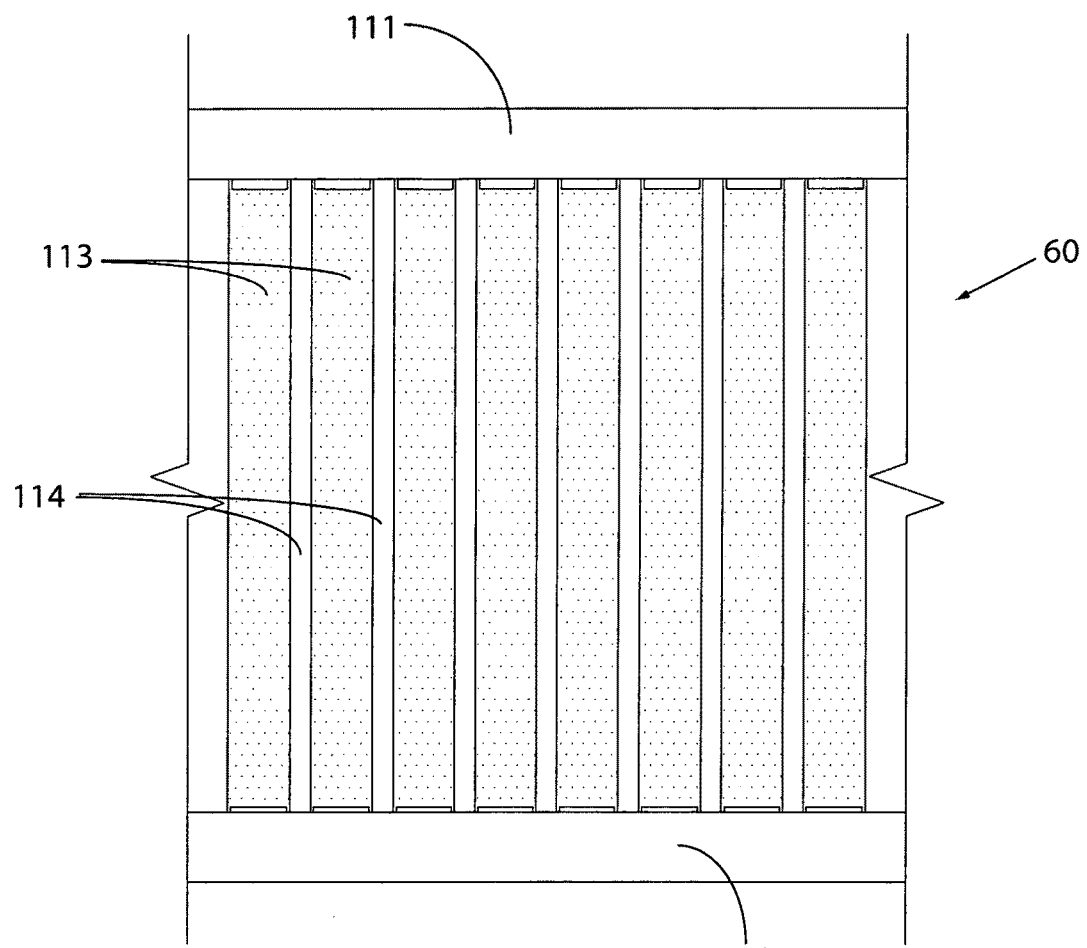
FIGS. 7A and 7B depict a third pattern of the glass channel arrays of the façade.
Figure 7B:
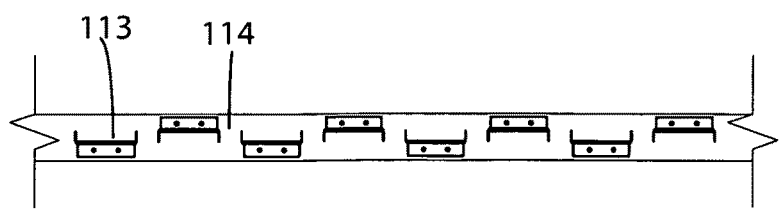

Pattern 3 (60) is depicted in FIGS. 7A and 7B. This is ⅓ spacing, where the gap distance 114 between adjacent channels 113 is about 3.25".

Figure 8A:
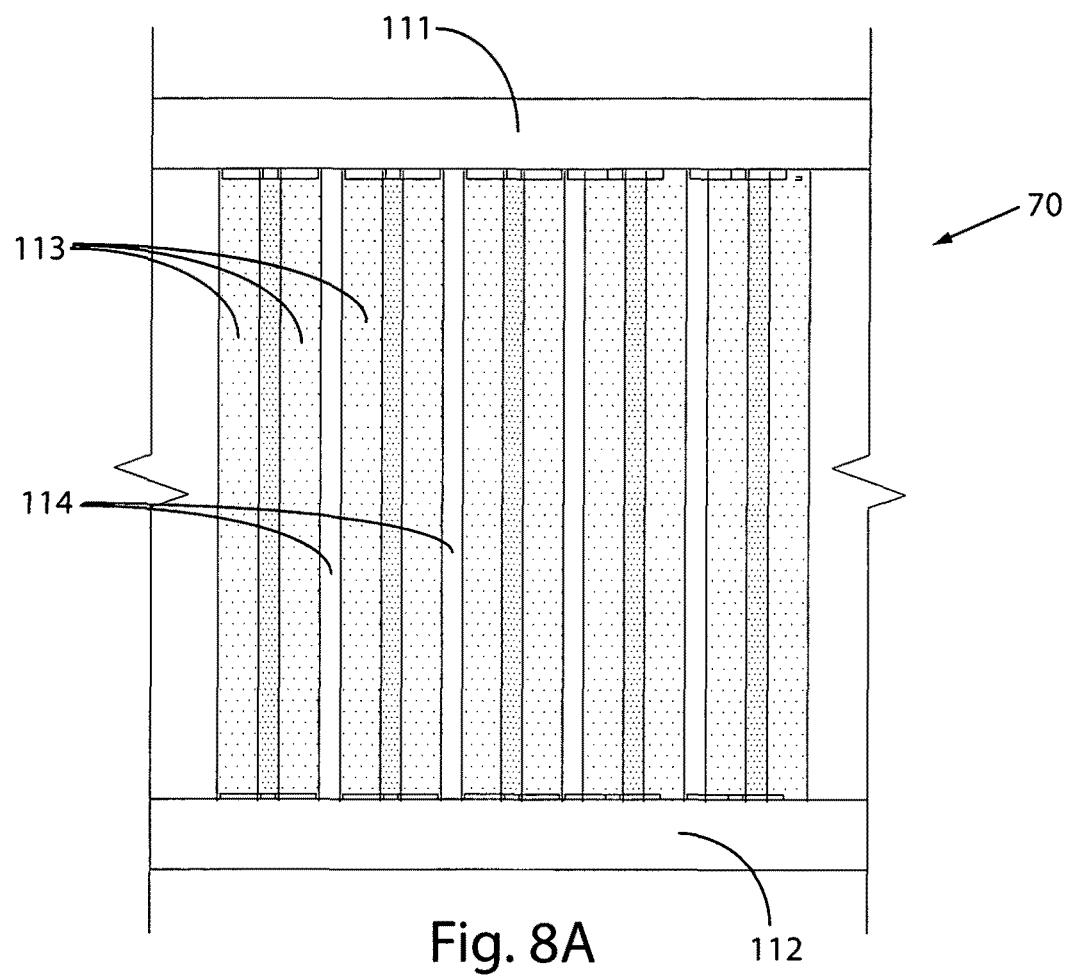
FIGS. 8A and 8B depict a fourth pattern of the glass channel arrays.
Figure 8B:
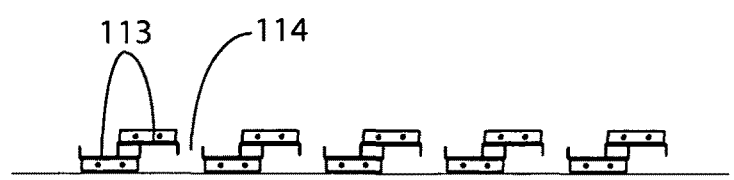

Pattern 4 (70) is depicted in FIGS. 8A and 8B. This is referenced as ⅓ overlap, wherein two adjacent channels 113 overlap by about ⅓, or 3.25 inches; and there is a gap 114 between adjacent overlapping pairs of channels of about 3.25".

Figure 9A:
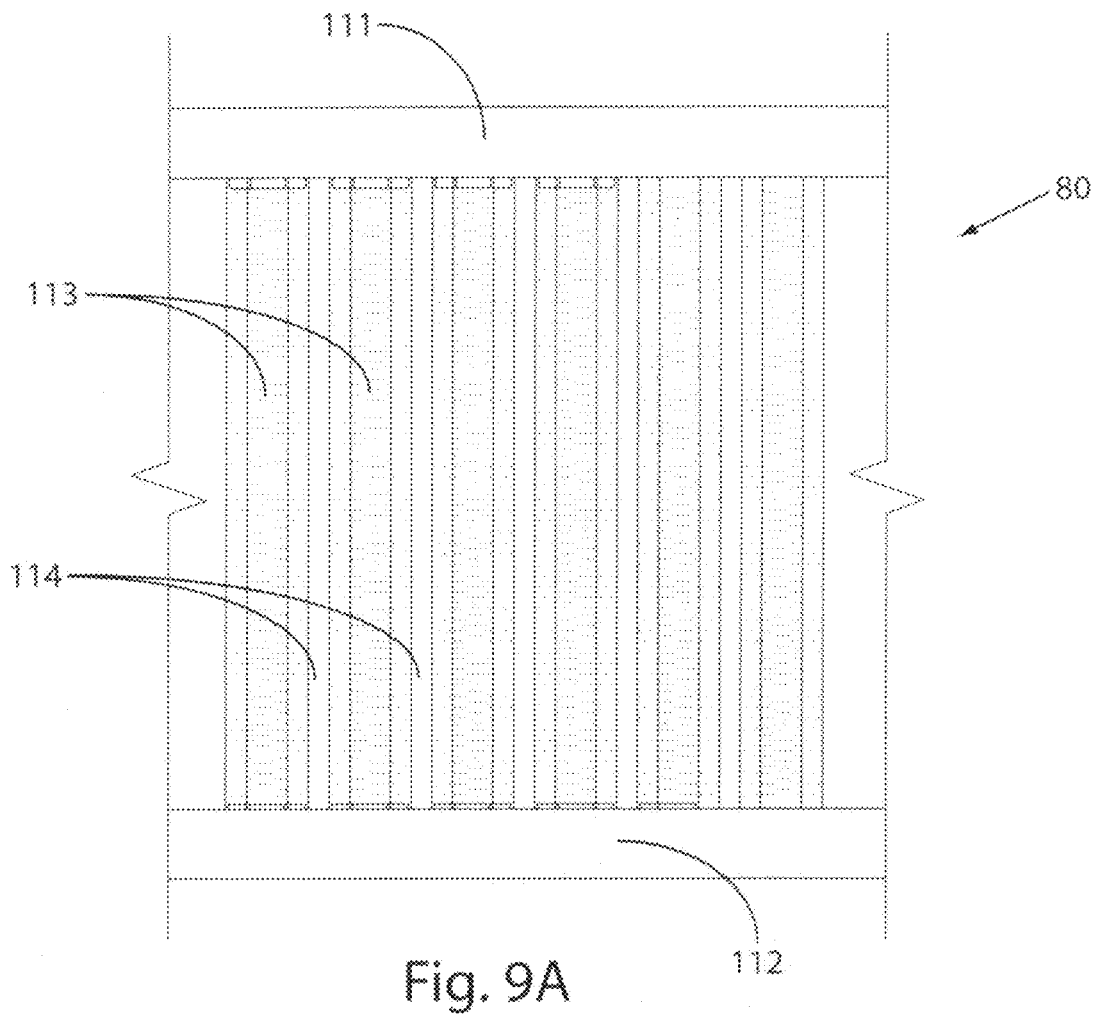
FIGS. 9A and 9B depict a fifth pattern of the glass channel arrays used in the façade.
Figure 9B:
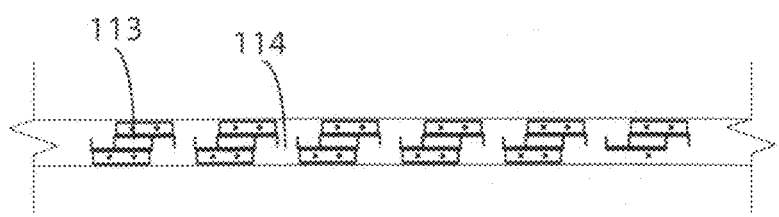

Pattern 5 (80) is depicted in FIGS. 9A and 9B. This is referenced as ⅔ overlap, where two adjacent channels 113 overlap by two thirds of their width and there is a gap 114 between adjacent pairs of channels of about 3.25".

Where the channels 113 overlap, one will be reversed so that the appropriate spacing in the aluminum mounting tubes 111 and 112 can be provided. It will be apparent to one skilled in the art that numerous spacing patterns may be provided, in part depending upon the visual effect desired and the required spacing for ventilation purposes.

Figure 11:
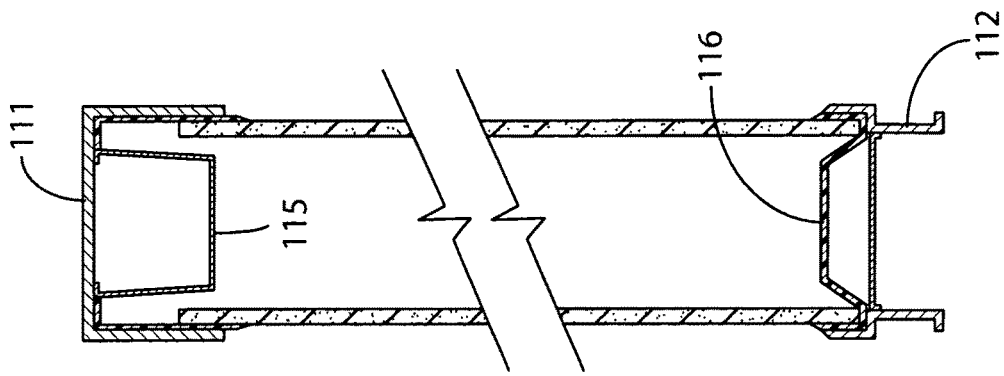
FIG. 11 is a sectional view of the array of FIG. 10, taken along the section lines A-A in FIG. 10.
Figure 10:
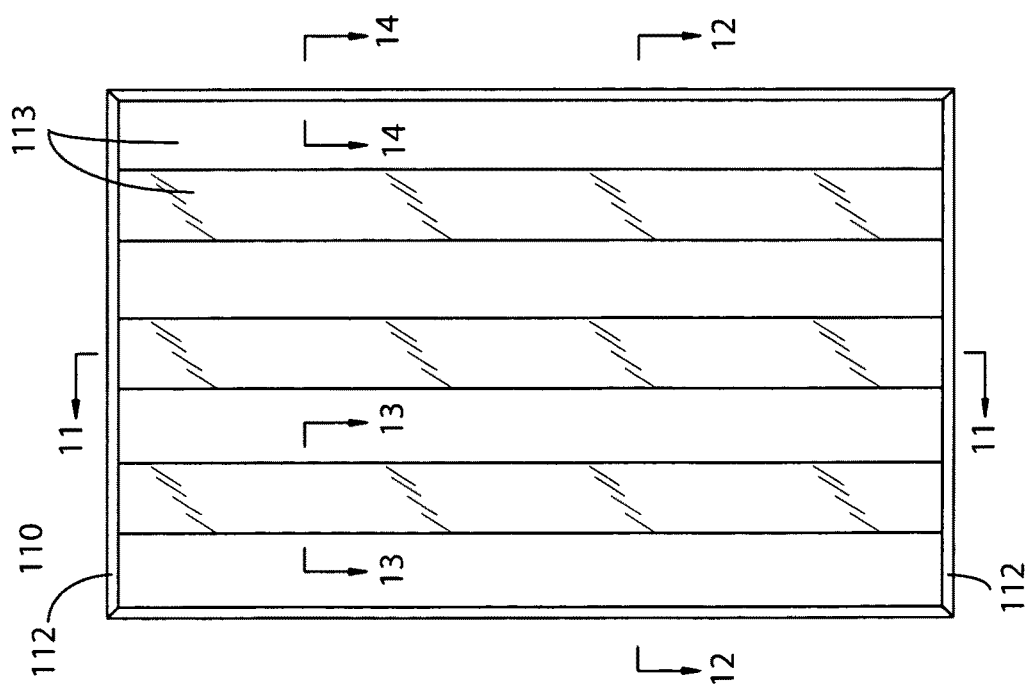
FIG. 10 is an enlarged elevational view of an exemplar array of glass channels as may be used in the invention, and showing one form of mounting the channels.
Figure 12:
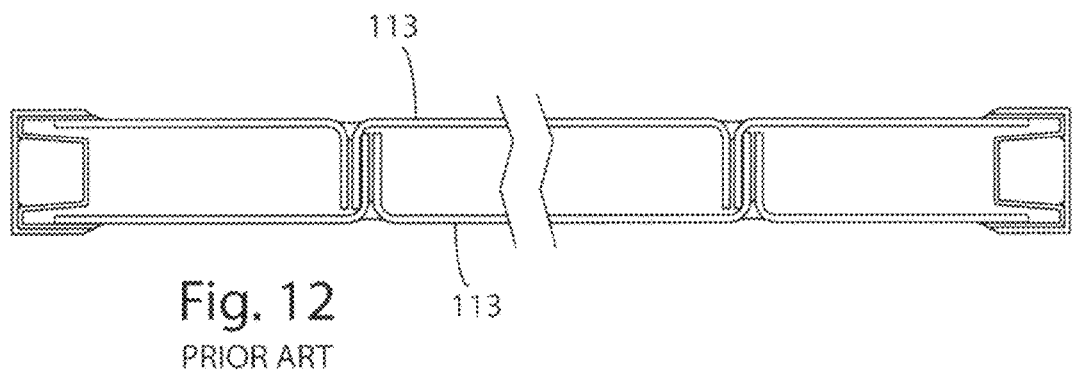
FIG. 12 is a sectional plan view of the array of FIG. 10, taken along the section lines B-B on FIG. 10.
Figure 13:
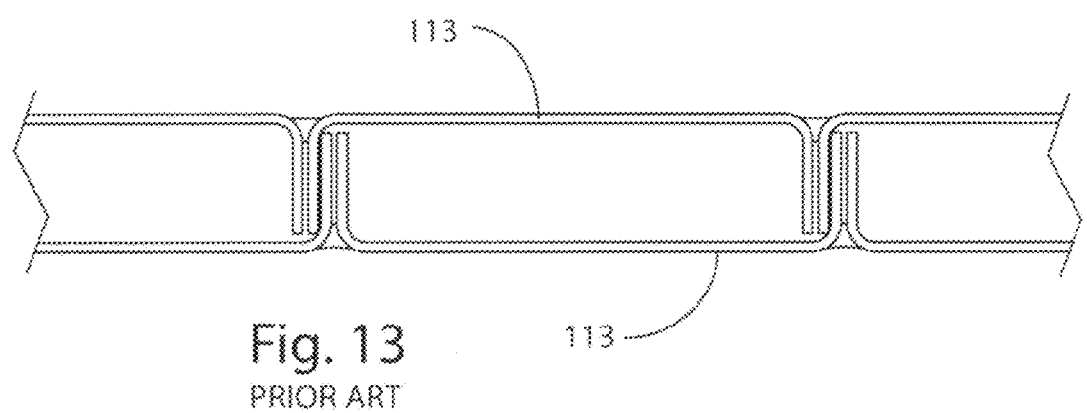
FIG. 13 is a sectional plan view of the array of FIG. 10, taken along the sectional lines C-C in FIG. 10.
Figure 14:
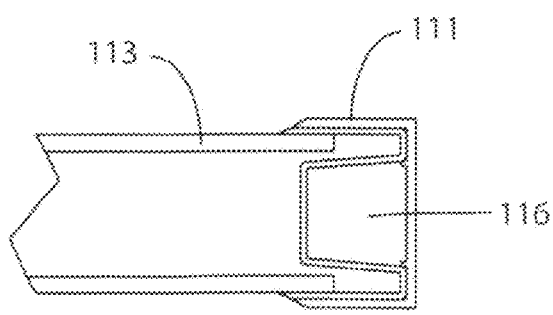
FIG. 14 is a sectional view of the array of FIG. 10, taken along the sectional lines D-D thereof.

Schematically illustrated in FIGS. 10-14 are exemplary mounting structures. These illustrations are taken from the Pilkington web site and are simply demonstrative as to how the glass channels or planks 113 may be held in place. Upper and lower tubular channels similar to 111 and 112 are provided to essentially anchor the upper and lower ends of each channel 113. To keep the channels mounted to the building and from moving laterally, and thereby preserve the necessary patterns, angled blocks, such as 115 and 116 in FIG. 11 are fixed at appropriate positions in the upper and lower tubes 111 and 112. FIGS. 12 and 13 demonstratively illustrate overlapping channels with no gaps between adjacent pairs but depict the general concept. Where partial overlapping and gaps between adjacent pairs of channels is desired the angled blocks such as 115 and 116 in the upper and lower tubes 111 and 112 will be fixedly positioned. A screw/nut arrangement (not shown) will permit easy lateral adjustment of the blocks 115 and 116 in each tube 111 and 112.

As an additional advantage of the energy efficient garage 20, the present invention includes six vertically stacked low-speed and schematically illustrated Aerotecture wind turbines 100 positioned in the "dead" corner 99 of the garage. As illustrated, they extend from the base line 21A above the first floor to slightly above the roof line 32 but may be positioned at different vertical spacing in this area.

Figure 15:
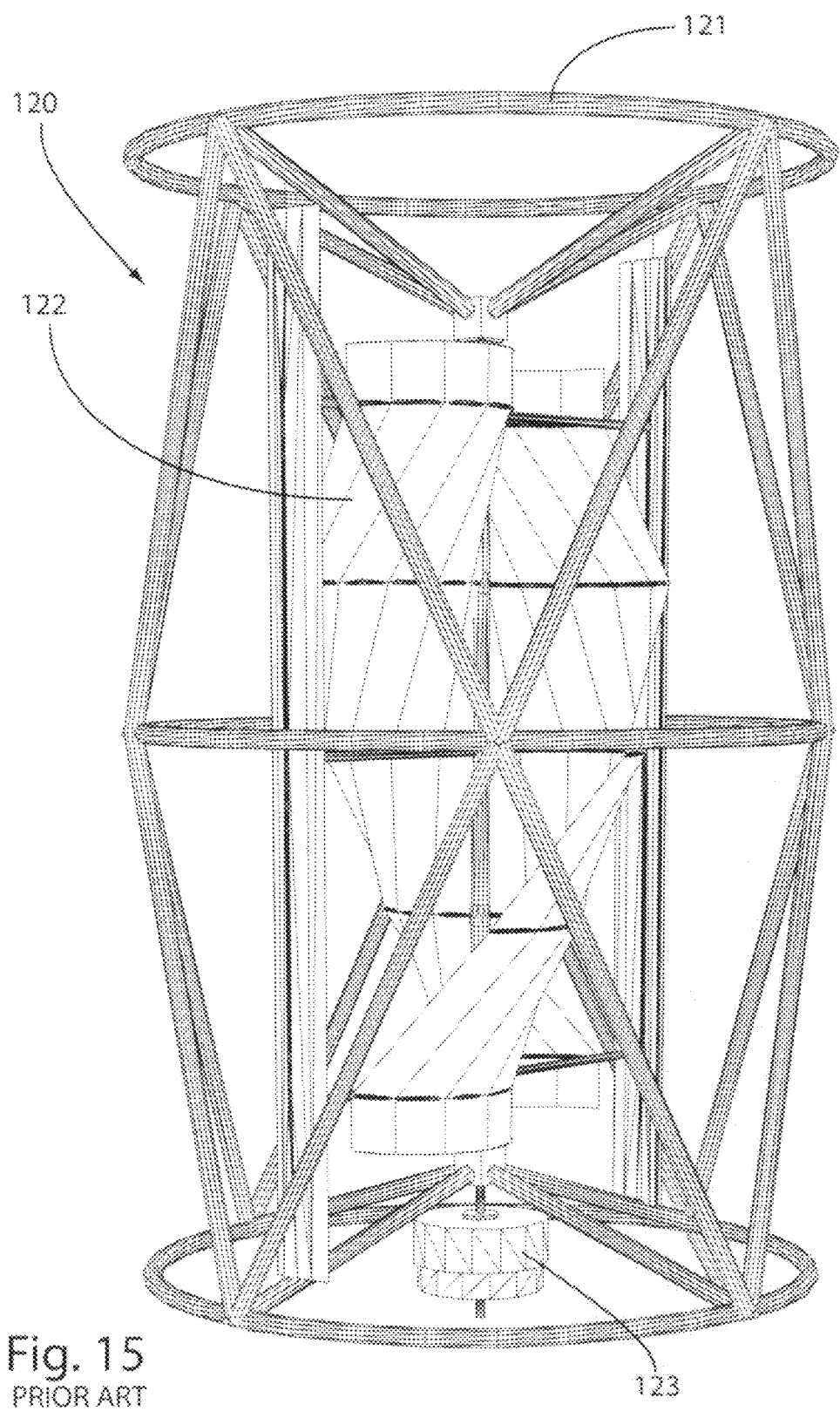
FIG. 15 is a schematic perspective view of a single wind turbine of the type stacked for use in the garage of FIG. 1.
Figure 17:
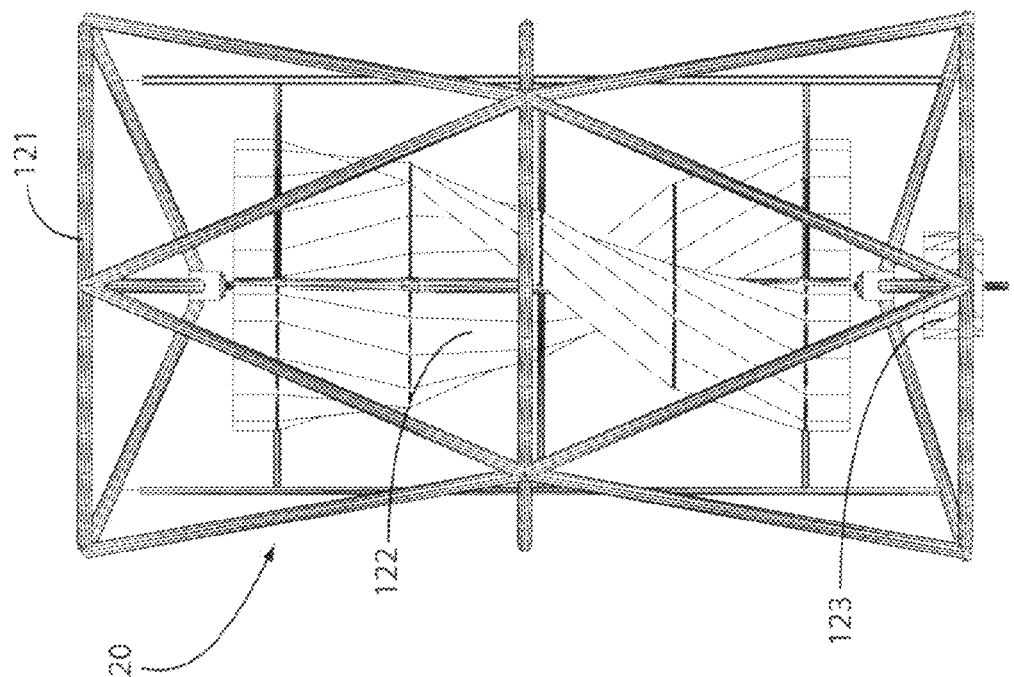
FIG. 17 is an elevational view of the wind turbine of FIG. 15.
Figure 16:
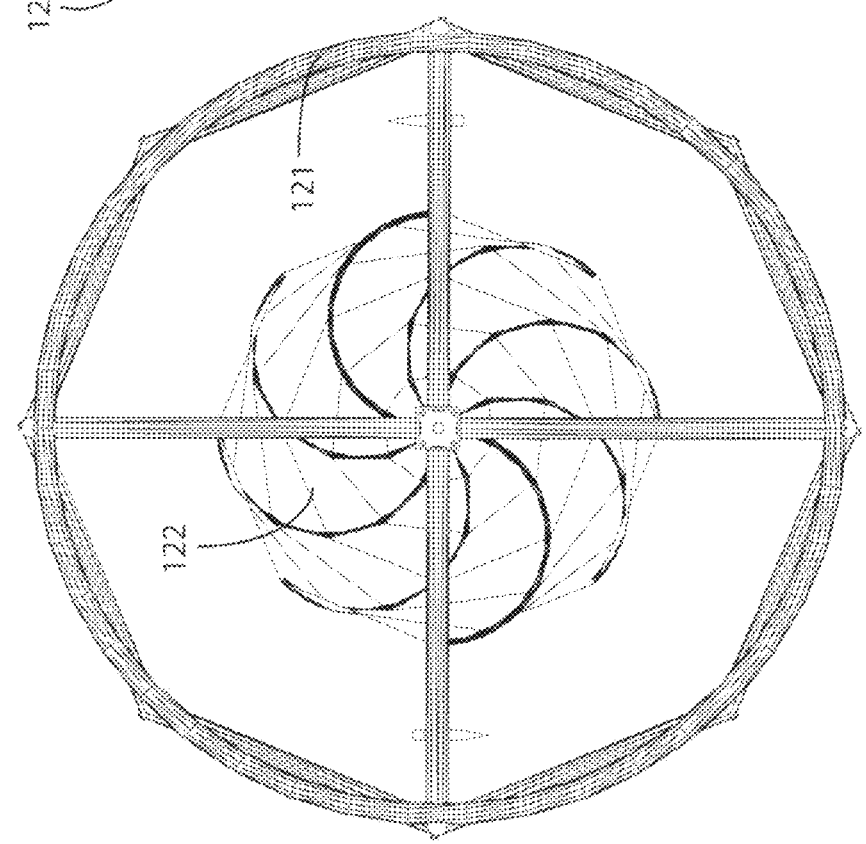
FIG. 16 is a plan view of the wind turbine of FIG. 15.

These turbines are ideal for use with an annual on-site average wind speed in excess of 10 mph. These highly efficient turbines will work at low wind speeds from about 1-2 mph and higher and are expected to generate 10-15,000 Kilowatt-hours of power per year of electricity. This is enough power to light the exterior garage glass channel facades. All energy generated is fed directly into a 2-way meter so that it contributes directly to the grid and will result in direct energy savings and reduced grid demand. Moreover, in addition to efficiently utilizing what would be dead space in the building, it adds a unique and distinctive architectural feature to the structure. In this instance, the wind turbines are those produced by Aerotecture International as their model 610V. A schematic version, from that company's web site is attached and depicted in FIGS. 15-17. Essentially each turbine 120 includes an outer support cage 121, capable of being vertically stacked; the vanes 122 positioned for rotation within the cage, and appropriate electrical connection facility 123 at the lower end of the vanes. In the illustrated embodiment, six turbines 120 are stacked vertically in the "dead" corner 99 of the garage structure (see FIG. 18).

As seen in FIGS. 18 and 19, there are numerous horizontal concrete beams 125 disposed angularly across the corner 99 of the garage. These beams provide several functions; they allow for anchoring of the cages along a vertical spine 126 running the full height of the corner and they also preclude vehicles from inadvertently running out of the garage!

To complete the esthetics and to facilitate air flow out of the garage, there are provided a series of vertically extending colored translucent glass panels 130 disposed behind the turbines 100 and extending vertically the height of the garage. The areas designated 128 are open areas permitting air flow and exhaustion of fumes from the garage. One form of glass panel may be that known as Vanceva which is also tempered so that if there is some impact of stones or the like they will not shatter. The glass panels 130 will provide a finished appearance consistent with the façade.

Figure 20:
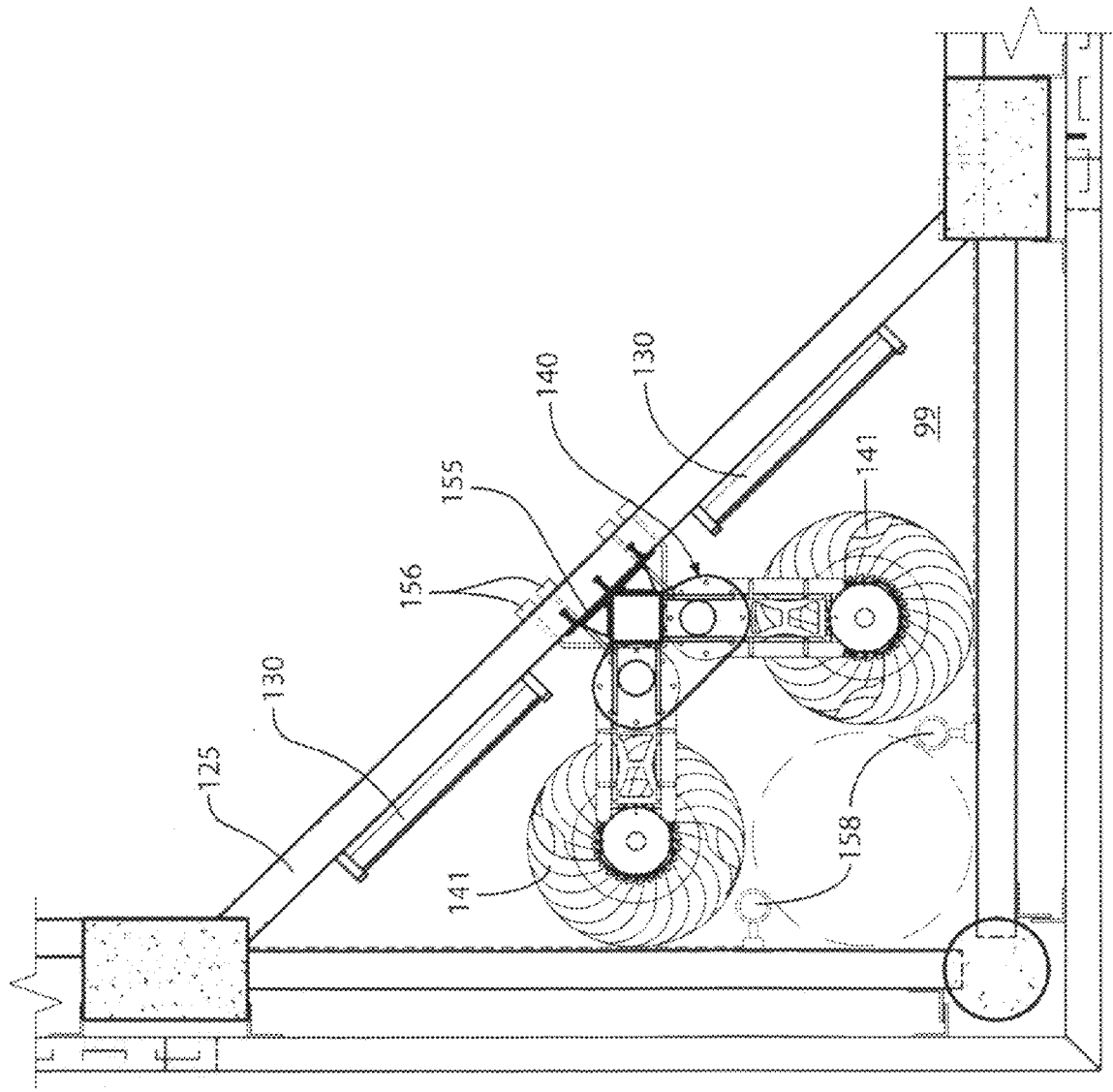
FIG. 20 is an exemplar plan view of one floor showing the position of an alternate preferred wind turbine structure in the corner of the garage.
Figure 21:
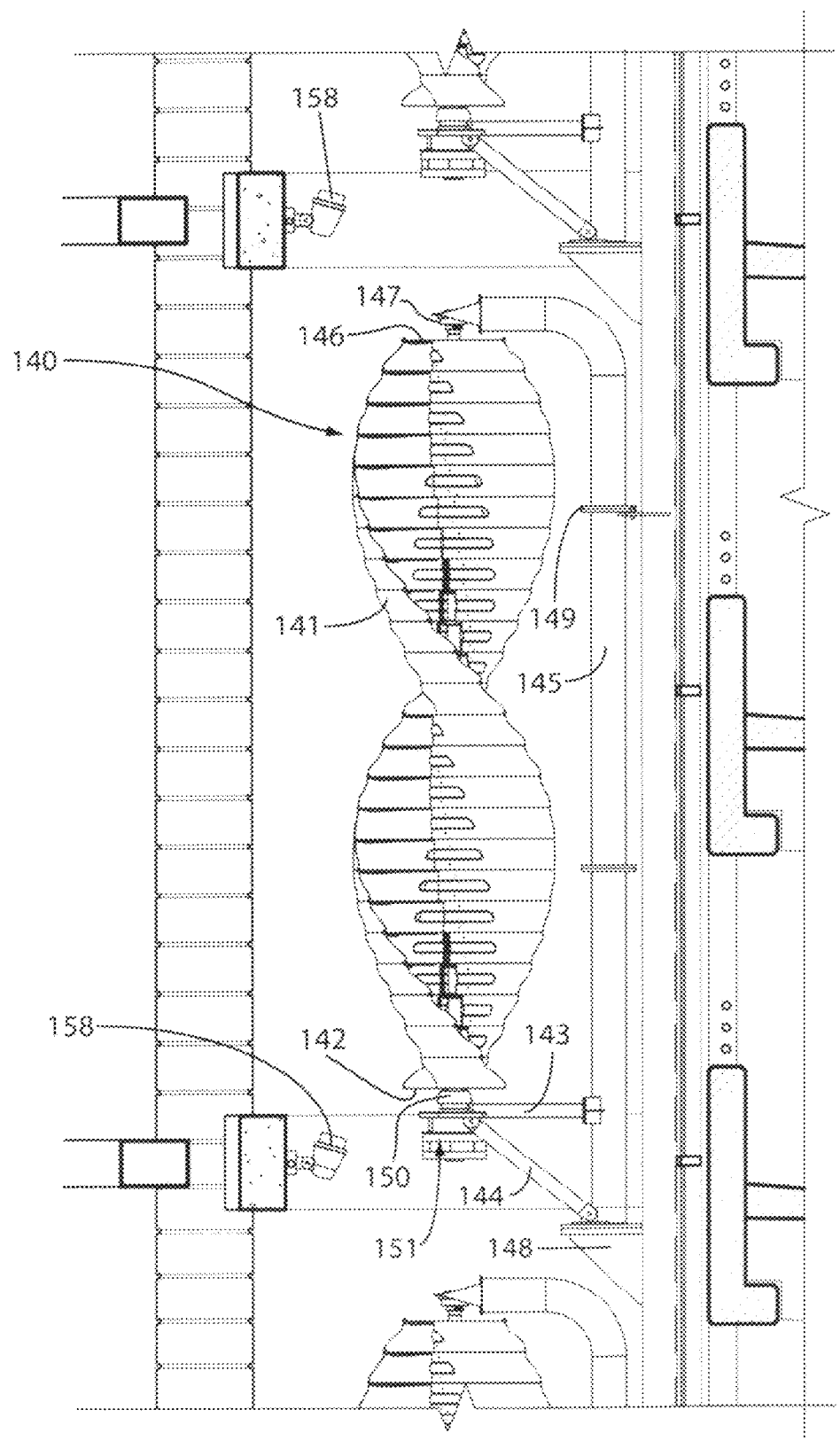
FIG. 21 is an elevational side view of one of the stacked wind-turbines located in the corner of the garage.
Figure 22:
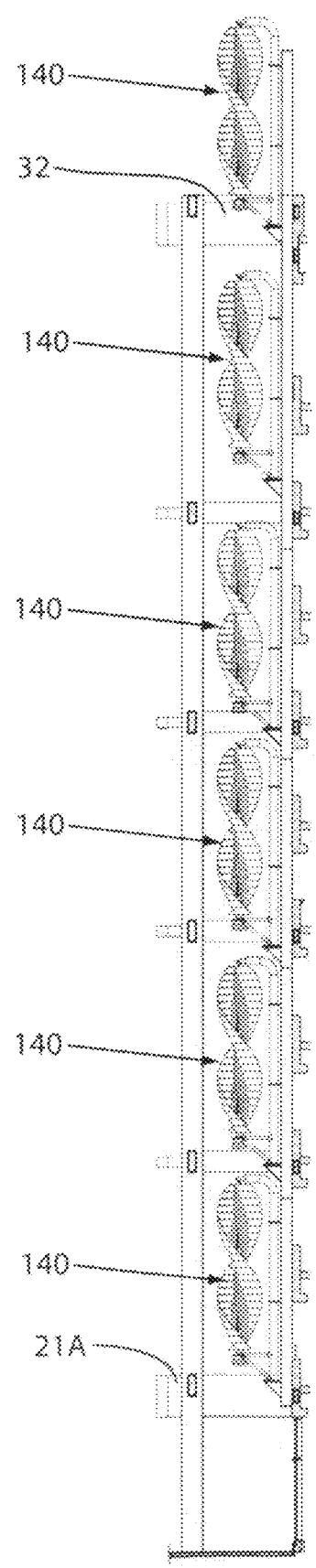
FIG. 22 is side elevational view showing six of the stacked wind-turbines as positioned in the corner of the garage and extending above the roof line.

It has been determined that a more efficient and less complex wind turbine structure may be used as the preferred embodiment. The preferred structure is illustrated in FIGS. 20-22. In the preferred embodiment a pair of wind turbines known as HELIXWIND Model S594 are provided at roughly each garage level. This is a Savonius turbine based design which catches wind from all directions and which creates smooth powerful torque to spin electric generators.

A side elevational view of the preferred turbine 140 is best seen in FIG. 21, and includes the helix shaped blade 141 mounted at its bottom 142 via a pair of struts 143, 144 to a vertical upright tube 145. The upper end 146 of the blade 141 is secured via bearing 147 to the upper end of tube 145. The tube itself is affixed to the garage structure via a lower bracket 148 affixed to the garage wall and by an upper bracket 149 also affixed to the wall. Embedded steel plates as at 155 (FIG. 20) with appropriate fasteners 156 are provided in the adjacent wall 125 to facilitate mounting.

The lower end of blade 141 is mounted via a bearing 150 which in turn is interconnected to a generator 151. Electrical power from the generator is ganged with the series of stacked blades 141 via appropriate electrical connections (not shown). An electric schematic and other specifications of the turbines 140 may be found on the Helix web site for this model, www.HelixWind.com, the subject matter of which is incorporated herein by reference.

As seen in the plan view of FIG. 20, two parallel spaced turbines 140 via blades 141 are mounted in the space previously allowed for the cage 121 which mounted a single turbine 120. This preferred embodiment of turbine in effect permits doubling the potential energy production without expanding the garage structure to accommodate the double blades 141.

As also shown in plan view a pair of lights 158 may be mounted on the adjacent garage structure to provide an a pleasing esthetic effect by emphasizing the blades and their movement. Similar lighting is provided for each of the stacked array of turbines 140. This is best seen in the schematic elevation view of FIG. 22, where six of the turbines are arranged in vertical position above the ground elevation 21A so as not to endanger pedestrians at the street level.

The foregoing is considered as illustrative only of the principles of the invention. Since numerous modifications and changes will readily occur to those skilled in the art, the invention is not limited to the preferred embodiment and all suitable modifications and equivalents may be resorted to, falling within the scope of the invention.

What is claimed is:

1. A multi-storied garage structure having an energy efficient power and ventilation system, comprising a baseline ground floor, at least two intermediate vehicle parking floors, each said parking floor being striped to deter a vehicle from accessing and parking in at least one corner of said floor, a rooftop, and at least three vertically disposed wind turbines whose longitudinal axes extends in the vertical direction and are affixed to the exterior of the multi-storied garage at said striped corner of said garage structure and disposed between said ground floor, said parking floors and the rooftop and wherein the topmost portion of the upper wind turbine extends above a horizontal line defined said rooftop, said wind turbines providing electrical energy serving said garage, the garage further including a ventilation system comprising a glass facade on at least one exterior perimeter wall, said glass facade comprising a plurality of glass channels arranged in arrays of different patterns of adjacent spacing between channels, the spacing between glass channels allowing evacuation of exhaust fumes from the interior of said garage, and said wind turbines cooperating with the openings between said spaced channels to aid in the exhaustion of fumes while concurrently generating electrical power.

* * * * *